(12) United States Patent
Kugai et al.

(10) Patent No.: US 6,641,863 B2
(45) Date of Patent: Nov. 4, 2003

(54) METHOD OF FORMING THIN FILM OF INORGANIC SOLID ELECTROLYTE

(75) Inventors: Hirokazu Kugai, Itami (JP); Nobuhiro Ota, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 79 days.

(21) Appl. No.: 10/016,357

(22) Filed: Oct. 30, 2001

(65) Prior Publication Data

US 2002/0106456 A1 Aug. 8, 2002

(30) Foreign Application Priority Data

Dec. 13, 2000 (JP) ........................................ 2000-378474

(51) Int. Cl.⁷ .............................................. C23C 16/30
(52) U.S. Cl. .............................. 427/126.1; 427/255.31; 427/530; 427/586; 204/192.1
(58) Field of Search .................. 427/248.1, 126.1, 427/255.31, 530, 586; 204/192.1

(56) References Cited

U.S. PATENT DOCUMENTS

| | | | |
|---|---|---|---|
| 3,901,733 A | * 8/1975 | Toy et al. | 429/320 |
| 5,725,965 A | * 3/1998 | Wachsman et al. | 429/33 |
| 6,025,094 A | 2/2000 | Visco et al. | |
| 6,300,000 B1 | * 10/2001 | Cavalca et al. | 429/40 |
| 6,369,934 B1 | * 4/2002 | Bechinger et al. | 359/265 |

FOREIGN PATENT DOCUMENTS

| | | |
|---|---|---|
| EP | 0206339 | 12/1986 |
| JP | 62-44960 | 2/1987 |
| JP | 03297005 | 12/1991 |
| JP | 5-48582 | 7/1993 |
| JP | 06275313 | 9/1994 |
| JP | 2000340257 | 12/2000 |

OTHER PUBLICATIONS

Shigenori Hama et al.; "Synthesis and High Lithium Ion Conductivity of New Glass–ceramics in the System $Li_2S$–$P_2S_5$,"; The 26$^{th}$ Symposium on Solid State Ionics in Japan Extended Abstracts, pp. 174–175; Nov. 15–17, 2000.
Akitoshi Hayashi et al.; "Preparation of $Li_2S$–$P_2S_5$ Amorphous Solid Electrolytes by Mechanical Milling," Communications of the American Ceramic Society; vol. 84, No. 2, 2001, pp. 477–479.

* cited by examiner

Primary Examiner—Bret Chen
(74) Attorney, Agent, or Firm—W. F. Fasse; W. G. Fasse

(57) ABSTRACT

A method of producing a thin film of an inorganic solid electrolyte having a relatively high ionic conductance is provided. In the method, a thin film made of an inorganic solid electrolyte is formed, by a vapor deposition method, on a base member being heated. The thin film obtained through the heat treatment exhibits an ionic conductance higher than that of the thin film formed on the base member not being heated. The ionic conductance can also be increased through the steps of forming the thin film made of the inorganic solid electrolyte on the base member at room temperature or a temperature lower than 40° C. and then heating the thin film of the inorganic solid electrolyte.

22 Claims, 1 Drawing Sheet

METHOD OF FORMING THIN FILM OF INORGANIC SOLID ELECTROLYTE

BACKGROUND OF THE INVENTION

1. Field of the Invention

The present invention relates to a method of forming a thin film of an inorganic solid electrolyte. In particular, the invention relates to a method of forming a thin film of an inorganic solid electrolyte applicable to an electrode of a lithium cell.

2. Description of the Background Art

A solid secondary cell with a thin lithium film has been proposed. Japanese Patent Laying-Open No. 62-44960 discloses a method for manufacturing such a solid cell. The method includes a process of successively forming a thin film of titanium disulfide as a positive electrode, a thin film of $Li_2O$—$Al_2O_3$ as an electrolyte, and a thin film of Li as a negative electrode on a substrate placed in an ionized cluster beam evaporation system.

Japanese Patent Publication No. 5-48582 discloses an electrolytic material for solid cells. The electrolytic material has a composition of a$X$—b$Li_2S$—$Y$ wherein X is selected from the group consisting of $P_2S_5$ and $SiS_2$, a is in the range of approximately 0.5 to approximately 2, b is in the range of 0.25 to 2, and Y is at least one type of oxygen-containing lithium compound. The composite material has an ionic conductivity of at least $0.75 \times 10^{-4}$ ohm$^{-1}$ cm$^{-1}$ at 25° C. In this conventional technique, the electrolytic material is produced through the fusion of the source materials and quenching of the fused materials.

On the other hand, advances have been made in commercialization of lithium secondary cells containing an organic solution of electrolytes. Lithium secondary cells are characterized by having a high-energy output per unit volume or per unit weight as compared with other cells. Lithium secondary cells have been developed as a power source for practical use in mobile communications equipment, notebook computers, electric vehicles and the like.

An attempt has been made to use lithium metal for a negative electrode for the purpose of improving the performance of the lithium secondary cell. Such a lithium negative electrode, however, has been accompanied by the risk of a dendroid growth of the lithium metal on the negative electrode during charging and discharging. The dendroid growth may form an internal short-circuit to the positive electrode and finally result in an explosion. An investigated technique for avoiding the risk is to form a thin film of a sulfide-based inorganic solid electrolyte on the lithium metal. Such a technique, however, has been accompanied by a problem that the thin film of the sulfide-based inorganic solid electrolyte formed on a base member through vapor deposition does not exhibit a significantly high ionic conductance.

U.S. Pat. No. 6,025,094 discloses a method for protecting the negative electrode of lithium from the above-described dendroid lithium metal by covering one surface of the negative electrode of lithium with a glassy or amorphous protection layer. The protection layer is made of 6LiI—$Li_3PO_4$—$P_2S_5$, $B_2O_3$—$LiCO_3$—$Li_3PO_4$, LiI—$Li_2O$—$SiO_2$ or $Li_xPO_yN_z$, for example, and formed on the lithium metal electrode by a plasma assisted deposition technique. The U.S. patent discloses that this protection layer conducts lithium ions. However, such a protection layer formed by the plasma assisted deposition technique may also have the problem that it does not exhibit a significantly high ionic conductivity. The U.S. Patent does not disclose or suggest any technique for enhancing the ion conductivity of the protection layer.

Recently, it is reported in "The 26th Symposium on Solid State Ionics in Japan, November, 2000, Extended Abstract, pages 174 and 175" that fast lithium ion conducting glass-ceramics were synthesized by heat treatment at around 200° C. of $Li_2S$—$P_2S_5$ amorphous powders. However, these glass-ceramics were bulky material in which $Li_7PS_6$ crystal phase was mainly precipitated.

SUMMARY OF THE INVENTION

One object of the present invention is to provide a method of producing a thin film of an inorganic solid electrolyte having a relatively high ionic conductance.

The inventors of the present invention have found that the ionic conductance of the thin film made of an inorganic solid electrolyte can be enhanced by forming the thin film of the inorganic solid electrolyte on a base member while heating the base member, or by forming the thin film of the inorganic solid electrolyte on the base member and thereafter heating the thin film.

Accordingly, the present invention is directed to a method of forming a thin film made of an inorganic solid electrolyte on a base member. The inventive method includes the step of forming, by a vapor deposition method, the thin film made of the inorganic solid electrolyte on the base member while the base member is being heated so that the thin film is caused to have an ionic conductance higher than that of such a thin film formed on a base member without being heated.

The present invention is directed to another method of forming a thin film made of an inorganic solid electrolyte on a base member. The inventive method includes the steps of forming the thin film made of the inorganic solid electrolyte on the base member at room temperature or at a temperature lower than 40° C., and heating the thin film made of the inorganic solid electrolyte to increase the ionic conductance of the thin film.

In the inventive methods, the temperature of the base member being heated is preferably 40° C. or higher and lower than the glass transition temperature of the thin film made of the inorganic solid electrolyte. In particular, the temperature of the base member being heated is preferably 40° C. to 200° C. and more preferably 100° C. or higher and lower than 179° C.

In the inventive methods, preferably, the thin film made of the inorganic solid electrolyte is heated at a temperature of 40° C. or higher and lower than the glass transition temperature of the thin film made of the inorganic solid electrolyte to increase the ionic conductance of the thin film. In particular, the thin film made of the inorganic solid electrolyte is heated preferably at a temperature of 40° C. to 200° C., more preferably at a temperature of 100° C. or higher and lower than 179° C., to increase the ionic conductance of the thin film.

In the inventive methods, the inorganic solid electrolyte preferably is a sulfide. In particular, the inorganic solid electrolyte preferably contains lithium with its content of 20% to 65% by atomic percent, one or more elements selected from the group consisting of phosphorus, silicon, boron, germanium and gallium, and sulfur. The inorganic solid electrolyte may further contain at least one element selected from the group consisting of oxygen and nitrogen.

In the methods according to the present invention, the finally produced thin film can have an ionic conductance higher than $5\times10^{-4}$ S/cm. In the method according to the present invention, the finally produced thin film can have an activation energy of 40 kJ/mol or lower.

In the methods according to the present invention, the thin film preferably has a thickness of 0.01 $\mu$m to 10 $\mu$m.

The base member used for the present invention may have a surface made of at least one type of metal selected from the group consisting of lithium and lithium alloy. The thin film can be formed on the surface made of the metal. In this case, the base member can be used for a lithium cell.

In the present invention, the vapor deposition method is any one method selected from the group consisting of sputtering, vacuum evaporation, laser ablation and ion plating.

The thin film finally obtained in the present invention is typically amorphous or glassy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
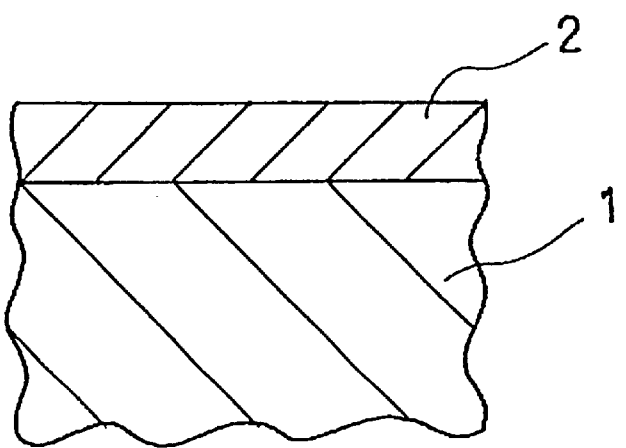
FIG. 1 schematically shows a thin film of an inorganic solid electrolyte formed on a base member according to the present invention, wherein the base member and the thin film of an inorganic solid electrolyte are denoted respectively by reference numerals 1 and 2.

In the present invention, any material may be used for the inorganic solid electrolyte as far as it provides an ion-conductive solid and it can form a thin film by vapor deposition. Inorganic solid electrolytes may include, for example, sulfides, oxides, nitrides, and mixtures thereof such as oxynitrides and oxysulfides. The sulfides may include $Li_2S$, a compound of $Li_2S$ and $SiS_2$, a compound of $Li_2S$ and $GeS_2$, and a compound of $Li_2S$ and $Ga_2S_3$. The oxynitrides may include $Li_3PO_{4-x}N_{2x/3}$, $Li_4SiO_{4-x}N_{2x/3}$, $Li_4GeO_{4-x}N_{2x/3}$ (0<x<4), and $Li_3BO_{3-x}N_{2x/3}$ (0<x<3). In the present invention, the inorganic solid electrolyte is preferably a compound containing lithium and more preferably a sulfide containing lithium. The cation conductor of the solid electrolyte in the present invention is typically a lithium ion ($Li^+$).

In the present invention, the inorganic solid electrolyte specifically contains components A to C as follows:
 A: lithium, the content of which is in the range of 20% to 65% by atomic percent;
 B: one or more elements selected from the group consisting of phosphorus, silicon, boron, germanium, and gallium; and
 C: sulfur.

The inorganic solid electrolyte may further contain at least one of oxygen and nitrogen. The content of element B is typically 0.1% to 30% by atomic percent. The content of element C is typically 20% to 60% by atomic percent. The content of one or both of oxygen and nitrogen is typically 0.1% to 10%.

In the present invention, any material may be used for the base without limitation. The base member may be made of an electrically insulating material, however, in terms of application thereof, at least a surface of the base member is preferably electrically conductive. Typically, the base member may be made of at least one material selected from the group consisting of metals, alloys, metal oxides and carbon. In particular, when the present invention is applied to the production of electrodes for lithium cells, the employed base member preferably has a surface made of lithium or a lithium alloy. The additive element of the lithium alloy may be In, Ti, Zn, Bi, or Sn. Specifically, the base member may be composed of a metal member (typically a metal foil or leaf) made of at least one selected from the group consisting of copper, nickel, aluminum, iron, niobium, titanium, tungsten, indium, molybdenum, magnesium, gold, silver, platinum, alloys of two or more metals from the foregoing, and stainless steel, and a thin film which is made of lithium or a lithium alloy and formed on the metal member. Alternatively, the base member may be composed of a metal oxide such as $SnO_2$ or an electrically conductive carbon such as graphite, and a thin film made of lithium or a lithium alloy formed thereon. In the base member, the thin film made of lithium or a lithium alloy typically has a thickness of 0.1 $\mu$m to 20 $\mu$m, and preferably a thickness of 1 $\mu$m to 10 $\mu$m. Alternatively, a foil or leaf made of lithium or a lithium alloy may be used as the base member. The base member used in the present invention may have a thickness of 1 $\mu$m to 100 $\mu$m from the viewpoint of the application to the lithium cell and may have a thickness of 1 $\mu$m to 20 $\mu$m to give a compact product.

In the present invention, a heater may generally be used in the heat treatment. The heater employed may be attached to a holder for holding the base member or may be a radiation heater. The heater can heat the base member or the thin film formed on the base member. On the other hand, the heating may be effected through a temperature rise caused by plasma or the like during the film deposition. In the film deposition process, plasma or the like can heat the base member so that the thin film can be formed on the base member having an increased temperature.

In the present invention, the heat treatment can effectively be carried out at a temperature higher than room temperature (5° C. to 35° C.) or at a temperature of 40° C. or higher. Thus, a temperature higher than room temperature such as a temperature of 40° C. or higher, preferably 100° C. or higher may be used as the base member temperature in the case that the thin film is heated through the heating of the base member, or as the temperature for the heat treatment of the formed thin film.

The thin film of the inorganic solid electrolyte produced according to the present invention is generally amorphous, and specifically glassy. Therefore, when the heating temperature is too high and close to the glass transition temperature of the thin film of the inorganic solid electrolyte, the amorphous structure of the obtained thin film may be degraded, and its ionic conductance may be lowered. Thus, the heating temperature is preferably below the glass transition temperature of the thin film of the inorganic solid electrolyte. Based on this point, a temperature of 200° C. or below is preferably used as the temperature of the base member in the case that the thin film is heated through the heating of the base member, or as the temperature for the heat treatment of the formed thin film. When the thin film of the inorganic solid electrolyte is formed on lithium metal, the heating temperature is preferably lower than 179° C. which is the melting point of metal lithium. Thus, the heating temperature is preferably lower than a temperature at which the texture of the thin film of the inorganic solid electrolyte changes (for instance, the glass transition temperature of the thin film of the inorganic solid electrolyte) and preferably lower than a temperature at which the structure of the base member can no longer be maintained (for instance, the melting point of the base member).

The thin film of the inorganic solid electrolyte formed according to the present invention typically has a thickness of 0.01 μm to 10 μm, and preferably a thickness of 0.1 μm to 2 μm.

The vapor deposition method employed in the present invention is typically selected from the group consisting of sputtering, vacuum evaporation, laser ablation, and ion plating. The degree of the vacuum of the background in the vapor deposition method is preferably not higher than $1.33 \times 10^{-4}$ Pa ($1 \times 10^{-6}$ Torr). When the thin film of the inorganic solid electrolyte is formed on lithium metal or a lithium alloy, a low vacuum degree may induce oxidation of lithium or degradation of the lithium by water. The atmosphere under which the thin film is formed by the vapor deposition method may comprise a gas inactive to lithium, such as helium, neon, argon, krypton, or a mixture gas of two or more from the foregoing. In particular, when the thin film of the inorganic solid electrolyte is formed on lithium metal or a lithium alloy, the purity of the gas constituting the atmosphere is preferably at least 99.99% so that no degradation of the lithium due to the water may occur.

Specifically, the present invention is applicable to the production of an electrode (negative electrode) for a lithium secondary cell. For this production, typically, the thin film of the inorganic solid electrolyte is formed on a base member having at least a surface part made of lithium or a lithium alloy. This base member is composed of a thin film made of lithium or a lithium alloy and another material on which the thin film is formed, or composed solely of lithium or a lithium alloy, as described above. In the base member, the thin film made of lithium or a lithium alloy formed on another material has a thickness of 0.1 μm to 20 μm, and preferably a thickness of 1 μm to 10 μm. If a foil or leaf made of lithium or a lithium alloy is used as the base member, the foil or leaf has a thickness of 1 μm to 100 μm, for example, and preferably 1 μm to 60 μm. If the base member is produced by forming a thin film of lithium or a lithium alloy on another material, the thin film of lithium or a lithium alloy can be formed by a vapor deposition method. Typically, the vapor deposition method is also selected from the group consisting of sputtering, vacuum evaporation, laser ablation, and ion plating. The degree of the vacuum of the background in the vapor deposition method is preferably not higher than $1.33 \times 10^{-4}$ Pa ($1 \times 10^{-6}$ Torr). A low vacuum degree may induce oxidation of lithium or degradation of the lithium by water. The atmosphere for the vapor deposition method may comprise a gas inactive to lithium, such as helium, neon, argon, krypton, or a mixture gas of two or more from the foregoing. In particular, the purity of the gas constituting the atmosphere is preferably at least 99.99% so that no degradation of the lithium due to the water may occur. According to the present invention, the thin film of the inorganic solid electrolyte may be formed on the base member having the thin film made of lithium or a lithium alloy formed on another material or on the base member made solely of lithium or a lithium alloy to produce an electrode (negative electrode) for a lithium secondary cell.

The method according to the present invention can produce a thin film of an inorganic solid electrolyte having an ionic conductance (conductivity) higher than $5 \times 10^{-4}$ S/cm at 25° C. The ionic conductance of the thin film of the inorganic solid electrolyte at 25° C. may be in the range of $5 \times 10^{-4}$ S/cm to $2.5 \times 10^{-3}$ S/cm, for example. In the method according to the present invention, the activation energy of the formed thin film of the inorganic solid electrolyte may be 40 kJ/mol or below, and may typically be in the range of 30 kJ/mol to 40 kJ/mol. Examples of the present invention are hereinafter described, however, the invention is not limited to these examples.

EXAMPLE 1

On a substrate of quartz glass, a 2 μm-thick thin film of an inorganic solid electrolyte was formed, and gold was vapor-deposited onto the thin film to form an electrode. The ionic conductance of the resultant thin film was measured through the electrode. The evaluation of the activation energy was made through the process in which the temperature dependency of the ionic conductance was determined through measurement temperature raising.

Tables 1 to 5 show the conditions under which the thin films of inorganic solid electrolytes were formed, together with the results of the evaluation. Sample No. 0 is for comparison, in which the film was formed at room temperature without being subjected to heat treatment. In the laser ablation method, a pressure of $2.66 \times 10^{-1}$ Pa ($2 \times 10^{-3}$ Torr), an atmosphere of Ar gas and KrF excimer laser were used. In the sputtering, a pressure of $1.33 \times 10^{1}$ Pa ($1 \times 10^{-1}$ Torr) and an atmosphere of Ar gas were used. In the vacuum evaporation, a pressure of 1.33 Pa ($1 \times 10^{-2}$ Torr) was used. In the ion plating, a pressure of 6.65 Pa ($5 \times 10^{-2}$ Torr) and an atmosphere of Ar gas were used. The thin films formed by these methods had respective compositions as shown in the tables. The temperature of the substrate heated while the thin film is deposited thereon is shown in the tables under "film deposition temperature" and the temperature of the heat treatment conducted after the film deposition is shown under "temperature of heat treatment after film deposition" in the tables.

An X-ray diffraction analysis was conducted for all of the formed thin films to reveal that the thin films were all amorphous or glassy.

As seen from the tables, the ion conductance of each of thin film samples No. 1 to No. 50 according to the present invention is higher than that of comparative sample No. 0.

TABLE 1

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 0 | laser ablation | $57Li_2S$—$38SiS_2$—$5Li_3PO_4$ | room temperature (25° C.) | no heat treatment | $3.0 \times 10^{-4}$ | 41 |
| 1 | sputtering | $57Li_2S$—$38SiS_2$—$5(Li_2O$—$P_2O_5)$ | 50 | no heat treatment | $7.0 \times 10^{-4}$ | 36 |
| 2 | sputtering | $57Li_2S$—$38SiS_2$—$5(Li_2O$—$P_2O_5)$ | 100 | no heat treatment | $1.8 \times 10^{-3}$ | 32 |
| 3 | sputtering | $57Li_2S$—$38SiS_2$—$5(Li_2O$—$P_2O_5)$ | 130 | no heat treatment | $2.0 \times 10^{-3}$ | 32 |
| 4 | sputtering | $57Li_2S$—$38SiS_2$—$5(Li_2O$—$P_2O_5)$ | 200 | no heat treatment | $1.7 \times 10^{-3}$ | 33 |

TABLE 1-continued

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 5 | sputtering | $57Li_2S$—$38SiS_2$—$5(Li_2O$—$P_2O_5)$ | room temperature (25° C.) | 50 | $6.0 \times 10^{-4}$ | 37 |
| 6 | sputtering | $57Li_2S$—$38SiS_2$—$5(Li_2O$—$P_2O_5)$ | room temperature (25° C.) | 100 | $1.6 \times 10^{-3}$ | 33 |
| 7 | sputtering | $57Li_2S$—$38SiS_2$—$5(Li_2O$—$P_2O_5)$ | room temperature (25° C.) | 130 | $1.7 \times 10^{-3}$ | 32 |
| 8 | sputtering | $57Li_2S$—$38SiS_2$—$5(Li_2O$—$P_2O_5)$ | room temperature (25° C.) | 200 | $1.7 \times 10^{-3}$ | 34 |
| 9 | sputtering | $60Li_2S$—$40SiS_2$ | 100 | no heat treatment | $1.5 \times 10^{-3}$ | 34 |
| 10 | sputtering | $60Li_2S$—$40SiS_2$ | 150 | no heat treatment | $1.5 \times 10^{-3}$ | 33 |

TABLE 2

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 11 | sputtering | $60Li_2S$—$40SiS_2$ | room temperature (25° C.) | 150 | $1.5 \times 10^{-3}$ | 32 |
| 12 | sputtering | $57Li_2S$—$38SiS_2$—$5Li_3PO_4$ | 130 | no heat treatment | $1.7 \times 10^{-3}$ | 34 |
| 13 | sputtering | $59.5Li_2S$—$40SiS_2$—$0.5Li_3PO_4$ | 130 | no heat treatment | $1.6 \times 10^{-3}$ | 34 |
| 14 | sputtering | $57Li_2S$—$38SiS_2$—$5Li_4SiO_4$ | 130 | no heat treatment | $1.8 \times 10^{-3}$ | 33 |
| 15 | sputtering | $57Li_2S$—$38SiS_2$—$5Li_3PO_{3.9}N_{0.1}$ | 130 | no heat treatment | $1.8 \times 10^{-3}$ | 34 |
| 16 | sputtering | $65Li_2S$—$34.5SiS_2$—$0.5Li_3PO_4$ | 130 | no heat treatment | $1.7 \times 10^{-3}$ | 34 |
| 17 | laser ablation | $60Li_2S$—$40SiS_2$ | 120 | no heat treatment | $1.9 \times 10^{-3}$ | 33 |
| 18 | laser ablation | $57Li_2S$—$38SiS_2$—$5(Li_2O$—$P_2O_5)$ | 120 | no heat treatment | $2.0 \times 10^{-3}$ | 32 |
| 19 | laser ablation | $57Li_2S$—$38SiS_2$—$5Li_3PO_4$ | 120 | no heat treatment | $2.0 \times 10^{-3}$ | 33 |
| 20 | laser ablation | $57Li_2S$—$38SiS_2$—$5Li_4SiO_4$ | 120 | no heat treatment | $2.1 \times 10^{-3}$ | 34 |

TABLE 3

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 21 | laser ablation | $60Li_2S$—$40SiS_2$ | room temperature (25° C.) | 140 | $1.7 \times 10^{-3}$ | 33 |
| 22 | laser ablation | $57Li_2S$—$38SiS_2$—$5(Li_2O$—$P_2O_5)$ | room temperature (25° C.) | 140 | $2.0 \times 10^{-3}$ | 32 |
| 23 | laser ablation | $57Li_2S$—$38SiS_2$—$5Li_3PO_4$ | room temperature (25° C.) | 140 | $1.8 \times 10^{-3}$ | 34 |
| 24 | laser ablation | $57Li_2S$—$38SiS_2$—$5Li_4SiO_4$ | room temperature (25° C.) | 140 | $1.7 \times 10^{-3}$ | 34 |
| 25 | vacuum evaporation | $60Li_2S$—$40SiS_2$ | 120 | no heat treatment | $1.7 \times 10^{-3}$ | 33 |
| 26 | vacuum evaporation | $60Li_2S$—$40SiS_2$ | 150 | no heat treatment | $1.8 \times 10^{-3}$ | 32 |
| 27 | vacuum evaporation | $57Li_2S$—$38SiS_2$—$5Li_3PO_4$ | 100 | no heat treatment | $1.8 \times 10^{-3}$ | 33 |
| 28 | vacuum evaporation | $57Li_2S$—$38SiS_2$—$5Li_3PO_4$ | 120 | no heat treatment | $2.0 \times 10^{-3}$ | 32 |
| 29 | vacuum evaporation | $57Li_2S$—$38SiS_2$—$5Li_3PO_4$ | 160 | no heat treatment | $2.1 \times 10^{-3}$ | 31 |
| 30 | vacuum evaporation | $57Li_2S$—$38SiS_2$—$5Li_3PO_4$ | 200 | no heat treatment | $1.9 \times 10^{-3}$ | 32 |

TABLE 4

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 31 | vacuum evaporation | $60Li_2S$—$39.5SiS_2$—$0.5Li_3PO_4$ | 120 | no heat treatment | $1.8 \times 10^{-3}$ | 33 |

TABLE 4-continued

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 32 | vacuum evaporation | $57Li_2S-38SiS_2-5(Li_2O-P_2O_5)$ | 120 | no heat treatment | $2.0 \times 10^{-3}$ | 32 |
| 33 | vacuum evaporation | $57Li_2S-38SiS_2-5Li_4SiO_4$ | 120 | no heat treatment | $2.0 \times 10^{-3}$ | 34 |
| 34 | vacuum evaporation | $60Li_2S-39.5SiS_2-0.5Li_4SiO_4$ | 120 | no heat treatment | $2.1 \times 10^{-3}$ | 33 |
| 35 | vacuum evaporation | $57Li_2S-38SiS_2-5Li_3BO_3$ | 120 | no heat treatment | $1.8 \times 10^{-3}$ | 34 |
| 36 | vacuum evaporation | $57Li_2S-38SiS_2-5Li_4GeO_4$ | 120 | no heat treatment | $1.7 \times 10^{-3}$ | 33 |
| 37 | vacuum evaporation | $60Li_2S-39.5GeS_2-0.5Li_4SiO_4$ | 120 | no heat treatment | $1.5 \times 10^{-3}$ | 33 |
| 38 | vacuum evaporation | $60Li_2S-39.5Ga_2S_3-0.5Li_4SiO_4$ | 120 | no heat treatment | $1.8 \times 10^{-3}$ | 32 |
| 39 | vacuum evaporation | $60Li_2S-39.5P_2S_5-0.5Li_4SiO_4$ | 120 | no heat treatment | $1.7 \times 10^{-3}$ | 34 |
| 40 | vacuum evaporation | $57Li_2S-38SiS_2-5Li_3PO_4$ | room temperature (25° C.) | 120 | $1.9 \times 10^{-3}$ | 34 |

TABLE 5

| Sample No. | method of film deposition | inorganic solid electrolyte material | film deposition temperature (° C.) | temperature of heat treatment after film deposition (° C.) | ionic conductance (S/cm) | activation energy (kJ/mol) |
|---|---|---|---|---|---|---|
| 41 | vacuum evaporation | $57Li_2S-38SiS_2-5Li_4SiO_4$ | room temperature (25° C.) | 160 | $1.8 \times 10^{-3}$ | 33 |
| 42 | vacuum evaporation | $60Li_2S-40SiS_2$ | room temperature (25° C.) | 120 | $1.7 \times 10^{-3}$ | 32 |
| 43 | vacuum evaporation | $57Li_2S-38SiS_2-5Li_3PO_{3.9}N_{0.1}$ | 120 | no heat treatment | $1.9 \times 10^{-3}$ | 33 |
| 44 | vacuum evaporation | $60Li_2S-39.5SiS_2-0.5Li_3PO_4$ | 120 | no heat treatment | $2.0 \times 10^{-3}$ | 32 |
| 45 | vacuum evaporation | $65Li_2S-34.5SiS_2-0.5Li_3PO_4$ | 130 | no heat treatment | $1.9 \times 10^{-3}$ | 34 |
| 46 | vacuum evaporation | $55Li_2S-44.5SiS_2-0.5Li_3PO_4$ | 130 | no heat treatment | $1.8 \times 10^{-3}$ | 33 |
| 47 | ion plating | $57Li_2S-38SiS_2-5Li_3PO_4$ | 120 | no heat treatment | $1.8 \times 10^{-3}$ | 33 |
| 48 | ion plating | $60Li_2S-39.5SiS_2-0.5Li_3PO_4$ | 120 | no heat treatment | $2.0 \times 10^{-3}$ | 32 |
| 49 | ion plating | $57Li_2S-38SiS_2-5Li_3PO_4$ | room temperature (25° C.) | 120 | $1.7 \times 10^{-3}$ | 34 |
| 50 | ion plating | $60Li_2S-39.5SiS_2-0.5Li_3PO_4$ | room temperature (25° C.) | 120 | $1.9 \times 10^{-3}$ | 32 |

EXAMPLE 2

A lithium metal thin film having a thickness of 10 μm was formed on a copper foil or leaf having a size of 100 mm×50 mm and a thickness of 10 μm by vacuum evaporation. On the thin film of the lithium metal, a thin film of an inorganic solid electrolyte was formed to have a thickness of 1 μm. Alternatively, two lithium metal foils or leafs each having the same size as that of the copper foil or leaf and each having a thickness of 30 μm were bonded to each other. The thin film of the inorganic solid electrolyte could be formed in a similar manner on the bonded lithium metal foils or leafs. The thin films of inorganic solid electrolytes were formed under the same conditions as those for samples Nos. 1–3, 5–7, 9–29, and 31–50 shown in the above tables.

Each base member having the thin film of lithium metal and the thin film of the inorganic solid electrolyte formed thereon was used as a negative electrode to produce a lithium secondary cell. Each negative electrode, a separator of porous polymer film, a positive electrode, an organic solution of electrolytes, and other conventionally required components were assembled into a lithium secondary cell.

The outline of the process of the cell and the results of examining the cell are as follows.

A mixture solution of ethylene carbonate (EC) and propylene carbonate (PC) was heated, and then $LiPF_6$ was dissolved in the solution. Polyacrylonitrile (PAN) was dissolved in the mixture solution in a high concentration. The solution was cooled to give a PAN preparation containing large amounts of EC and PC with $LiPF_6$ dissolved. $LiCoO_2$ particles as an active material and carbon particles for providing electron conductivity were added to the PAN preparation. The resulting mixture was applied in a thickness of 300 μm onto a 20 μm-thick aluminum foil or leaf (a collector member for a positive electrode) to produce a positive electrode.

Each negative electrode having the thin film of the solid electrolyte, a separator (porous polymer film), and the positive electrode were stacked and then placed into a stainless steel container. An organic solution of an electrolyte containing 1 mole % $LiPF_6$ as the electrolytic salt in a mixture solution of EC and PC was added dropwise to the container. The stainless steel container was sealed under an argon gas atmosphere having a dew point of −60° C. or below to give a lithium secondary cell.

The prepared cells were examined for the charge and discharge characteristics. In the examination, each cell was charged at a voltage of 4.2 V and maintained a capacity of 0.5 Ah (ampere-hour) until a constant discharge at 100 mA allowed the voltage to drop to 3.5 V. The energy density of each cell was in the range of 500 to 550 Wh (watt-hour)/l (liter). Each cell also remained stable after one hundred cycles of the charge and discharge under the same conditions.

As described above, a thin film of an inorganic solid electrolyte having a high ionic conductance can be provided according to the present invention. In addition, the thin film of the inorganic solid electrolyte formed according to the present invention can be used as a material for a lithium secondary cell, which can consequently have a high energy density, excellent charge and discharge cycle characteristics, and a high stability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a product including a thin film of an inorganic solid electrolyte, comprising the steps:
   a) providing a base member;
   b) heating the base member to a heating temperature; and
   c) while heating the base member to the heating temperature, forming a thin film of an inorganic solid electrolyte on the base member by a vapor deposition process, wherein the inorganic solid electrolyte is a sulfide that contains sulfur, 20 to 65 atomic percent of lithium, and at least one element selected from the group consisting of phosphorous, silicon, boron, germanium and gallium;
   wherein the heating temperature is at least 40° C. and lower than a glass transition temperature of the thin film of the inorganic solid electrolyte; and
   wherein carrying out at least the steps a), b) and c) produces the product including the thin film of the inorganic solid electrolyte on the base member, in which the thin film is amorphous or glassy and has an ionic conductance higher than would have resulted without the heating of the base member to the heating temperature.

2. The method according to claim 1, wherein the heating temperature is in a range from 40° C. to 200° C.

3. The method according to claim 1, wherein the heating temperature is at least 100° C. and lower than 179° C.

4. The method according to claim 1, wherein the inorganic solid electrolyte further contains at least one element selected from the group consisting of oxygen and nitrogen.

5. The method according to claim 1, wherein the ionic conductance of the thin film in the product is higher than $5 \times 10^{-4}$ S/cm.

6. The method according to claim 1, wherein the thin film in the product has an activation energy of 40 kJ/mol or lower.

7. The method according to claim 1, wherein the thin film has a thickness of 0.01 $\mu$m to 10 $\mu$m.

8. The method according to claim 1, wherein the base member has a surface made of at least one type of metal selected from the group consisting of lithium and lithium alloys, and the thin film is formed on the surface made of the metal.

9. The method according to claim 8, wherein the product is a lithium cell further including a container, a positive electrode and a separator, and the method further comprises a step of assembling the positive electrode, the separator, and the thin film on the base member as a negative electrode, in the container to produce the lithium cell.

10. The method according claim 1, wherein the vapor deposition process is any one process selected from the group consisting of sputtering, vacuum evaporation, laser ablation and ion plating.

11. A method of producing a product including a thin film of an inorganic solid electrolyte, comprising the steps:
    a) providing a base member;
    b) forming a thin film of an inorganic solid electrolyte on the base member at a temperature lower than 40° C., wherein the inorganic solid electrolyte is a sulfide that contains sulfur, 20 to 65 atomic percent of lithium, and at least one element selected from the group consisting of phosphorous, silicon, boron, germanium and gallium; and
    c) after the step b), heating the thin film to a heat treating temperature so as to increase an ionic conductance of the thin film, wherein the heat treating temperature is at least 40° C. and lower than a glass transition temperature of the thin film of the inorganic solid electrolyte; and
    wherein carrying out at least the steps a), b) and c) produces the product including the thin film of the inorganic solid electrolyte on the base member, in which the thin film is amorphous or glassy.

12. The method according to claim 11, wherein the temperature lower than 40° C. in the step b) is room temperature.

13. The method according to claim 11, wherein the heat treating temperature is in a range from 40° C. to 200° C.

14. The method according to claim 11, wherein the heat treating temperature is at least 100° C. and lower than 179° C.

15. The method according to claim 11, wherein the inorganic solid electrolyte further contains at least one element selected from the group consisting of oxygen and nitrogen.

16. The method according to claim 11, wherein the ionic conductance of the thin film in the product is higher than $5 \times 10^{-4}$ S/cm.

17. The method according to claim 11, wherein the thin film in the product has an activation energy of 40 kJ/mol or lower.

18. The method according to claim 11, wherein the thin film has a thickness of 0.01 $\mu$m to 10 $\mu$m.

19. The method according to claim 11, wherein the base member has a surface made of at least one type of metal selected from the group consisting of lithium and lithium alloys, and the thin film is formed on the surface made of the metal.

20. The method according to claim 19, wherein the product is a lithium cell further including a container, a positive electrode and a separator, and the method further comprises a step of assembling the positive electrode, the separator, and the thin film on the base member as a negative electrode, in the container to produce the lithium cell.

21. The method according to claim 11, wherein the forming of the thin film is carried out by a vapor deposition process.

22. The method according claim 21, wherein the vapor deposition process is any one process selected from the group consisting of sputtering, vacuum evaporation, laser ablation and ion plating.

* * * * *